C. C. COLE.
Whiffletree.
No. 98,563.
Patented Jan. 4, 1870.
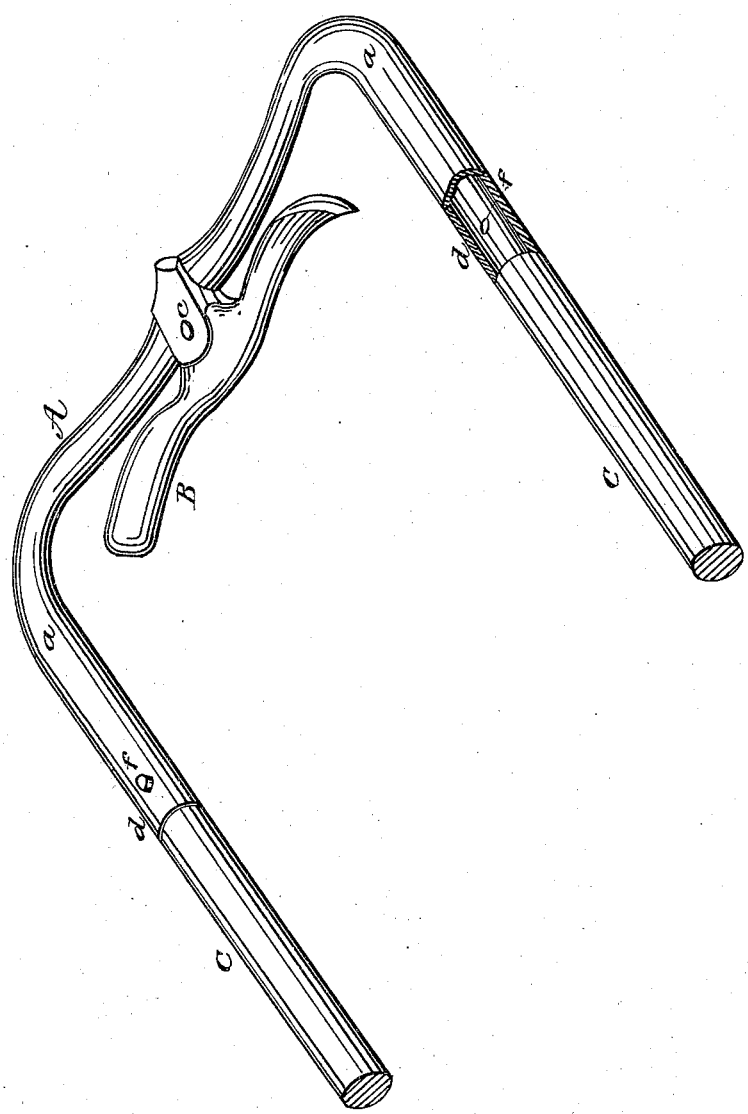
Witnesses:
R. F. Osgood
Geo. H. Miatt
Inventor:
Cyrus C. Cole
By J. Fraser & Co.
Attys

United States Patent Office.

CYRUS C. COLE, OF PHELPS, NEW YORK.

Letters Patent No. 98,563, dated January 4, 1870.

IMPROVED DRAUGHT-ATTACHMENT FOR HORSES.

The Schedule referred to in these Letters Patent and making part of the same

*To all whom it may concern:*

Be it known that I, CYRUS C. COLE, of Phelps, in the county of Ontario, and State of New York, have invented a certain new and useful Improvement in Draught-Attachment for Horses; and I do hereby declare that the following is a full and exact description of the same, reference being had to the accompanying drawings, making part of this specification, in which the figure represents a perspective view of my improvement, with a pair of thills connected therewith.

My invention consists in the combination of a pivoted breast-block and shoulder-yoke, for taking the place of the ordinary collar and traces, and also in the connection of the thills with said yoke, in such a manner as to make a stiff connection through.

In the drawings—
A represents the shoulder-yoke;
B, the breast-block; and
C C, the thills.

The yoke is simply a bent iron, of such size as to admit the breast and shoulders of the horse, the bent ends *a a* standing backward, in the direction of the thills, and to any desired degree.

The breast-block is fashioned in such form as to fit, easily, the horse's breast, and it may be padded or not, as necessity may require.

It is pivoted to a bearing, *c*, of the front of the yoke, so as to swing easily as the horse travels.

This breast-block takes the place of the ordinary leather collar or breast-plate, and it is by this alone that power is applied.

The rear ends of the shoulder-yoke are formed into sockets, *d d*, which receive the ends of the thills C C. The connection may be made by pins *f f*, which pass through holes in the sockets and thills, or by springs, which catch automatically, or by any other arrangement that will fasten the parts.

The thills, and with them the shoulder-yoke and breast-block, are held up in position by the ordinary loops of the harness.

The holdback-arrangement is also the same as in common harnesses. But the yoke and breast-block dispense with the collar, hames, and all that portion of the harness in front which is generally used to produce the forward draught.

The yoke does not touch the horse at all, being held off at the front and sides. The breast-block alone comes in contact with the breast of the horse, and by reason of being pivoted, adapts itself exactly, as the animal travels.

By the connection of the thills with the yoke, as described, a stiff connection is made all around the horse, and the draught is produced upon the thills, thereby dispensing with both the whiffletree and the tugs or traces. The breast-block takes the place of the whiffletree, by applying the power in front, which is made to act upon the thills.

What I claim as my invention, and desire to secure by Letters Patent, is—

The combination of the pivoted breast-block B and shoulder-yoke A, operating in the manner and for the purpose specified.

Also, the arrangement of the shoulder-yoke A, breast-block B, and thills C C, so connected that the forward draught may be applied through the thills, as herein described.

In witness whereof, I have hereunto signed my name, in the presence of two subscribing witnesses.

CYRUS C. COLE.

Witnesses:
R. F. OSGOOD,
GEO. W. MIATT.